United States Patent
van Esch et al.

(10) Patent No.: US 6,471,049 B1
(45) Date of Patent: Oct. 29, 2002

(54) CONVEYOR MAT BUILT UP FROM PLASTIC MODULES, AND MODULE FOR SUCH CONVEYOR MAT

(75) Inventors: Franciscus Josephus M. van Esch, Breda; George Johannes van Zijderveld, 's-Gravenzande, both of (NL)

(73) Assignee: MCC Nederland B.V., Gravenzande (NL)

( * ) Notice: Subject to any disclaimer, the term of this patent is extended or adjusted under 35 U.S.C. 154(b) by 0 days.

(21) Appl. No.: 09/786,612
(22) PCT Filed: Sep. 9, 1999
(86) PCT No.: PCT/NL99/00559
§ 371 (c)(1),
(2), (4) Date: Jun. 4, 2001
(87) PCT Pub. No.: WO00/13993
PCT Pub. Date: Mar. 16, 2000

(30) Foreign Application Priority Data

Sep. 9, 1998 (NL) .............................................. 1010040

(51) Int. Cl.⁷ .............................................. B65G 17/06
(52) U.S. Cl. ..................................................... 198/853
(58) Field of Search .................................. 198/852, 853

(56) References Cited

U.S. PATENT DOCUMENTS

| 4,051,949 | A | * | 10/1977 | Lapeyre ....................... 198/853 |
| 4,765,454 | A | * | 8/1988 | Hodlewsky et al. ......... 198/853 |
| 4,893,710 | A | * | 1/1990 | Bailey et al. ................ 198/853 |
| 4,993,544 | A | * | 2/1991 | Bailey et al. ................ 198/853 |

* cited by examiner

Primary Examiner—Joseph E. Valenza
(74) Attorney, Agent, or Firm—Varnum, Riddering, Schmidt & Howlett LLP

(57) ABSTRACT

A conveyor mat built up from hingedly intercoupled plastic modules, each module consisting of a number of substantially equally spaced apart hinge plates extending throughout the length of the module and provided with hinge loops at both ends thereof, the outer hinge plate and a plate-shaped part located on the outer side of a module of at least a number of modules extending to a position below the bottom face of the mat formed by the successive modules or being provided with a recess in the longitudinal direction of the module, the arrangement being such that the thus formed downward extension and/or the recesses form a lateral guide for the conveyor mat and can cooperate with a tubular or U-shaped guide section respectively.

8 Claims, 4 Drawing Sheets

CONVEYOR MAT BUILT UP FROM PLASTIC MODULES, AND MODULE FOR SUCH CONVEYOR MAT

Figure 1:
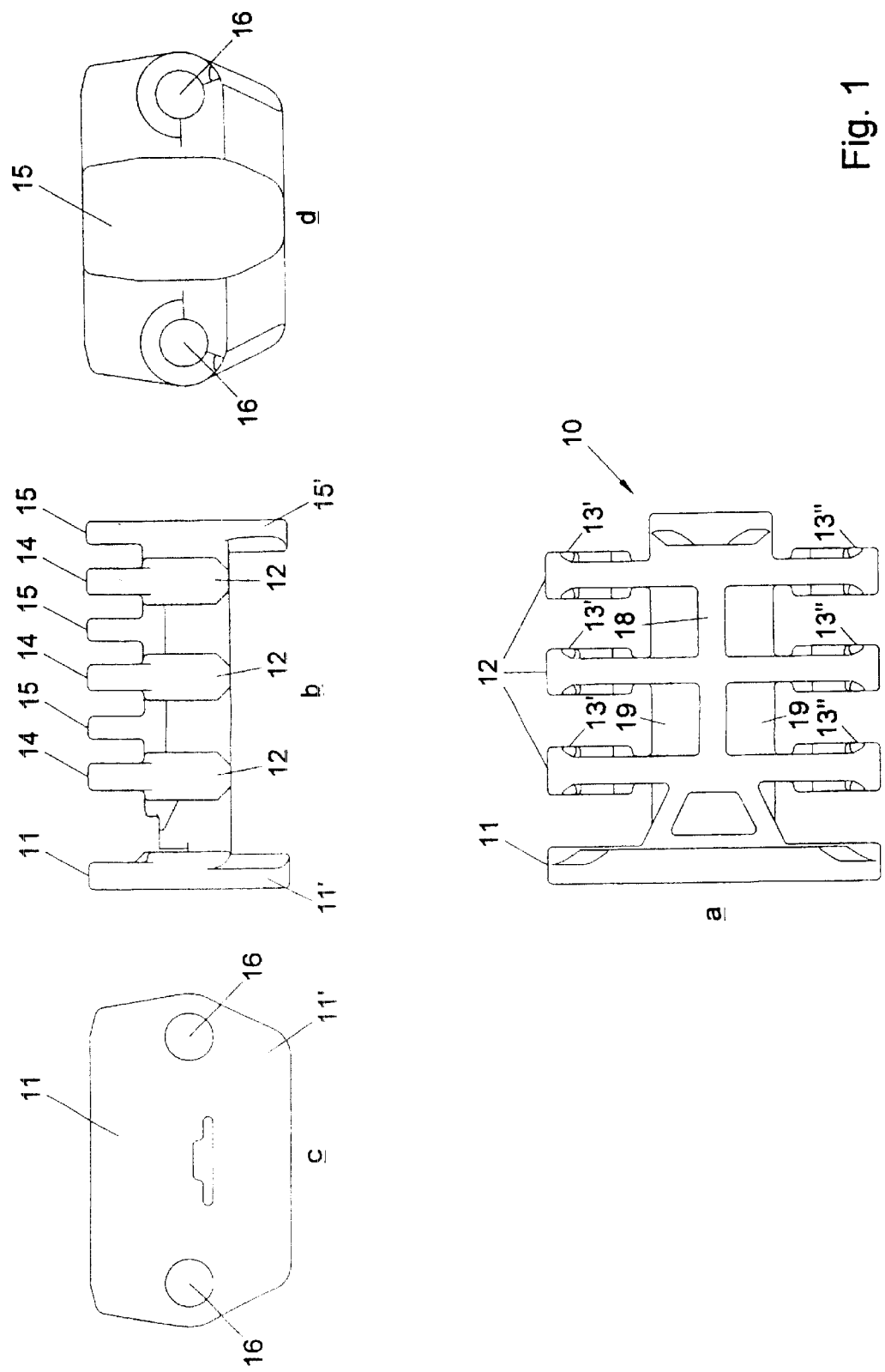

The invention relates to a conveyor mat built up from modules manufactured in one whole from plastic, each module consisting of a number of substantially equally spaced apart hinge plates and an end hinge plate, each extending over substantially the entire length of the module and each having both ends provided with hinge loops, the hinge plates of a module being intercoupled by at least one transverse rib and there being provided, adjacent at least the outer hinge plate at the transverse end of the module located opposite the end hinge plate, a plate-shaped part extending parallel to said hinge plate over a distance smaller than the distance between the hinge loops in a hinge plate and coupled to the at least one rib of the module and whose top side lies substantially in one plane with the top side of the mat, the end hinge plates of the successive modules being alternately located on one and on the other lateral side of the conveyor mat, the ends of the hinge plates on a longitudinal side of a module being located between the ends of the hinge plates of a module adjoining in longitudinal direction of the mat, the hinge loops of the two modules being substantially in alignment and intercoupled by a hinge pin extending through the hinge loops.

Such modular conveyor mat is known from EP-A-0 598 453. This patent application describes a conveyor mat consisting of first and second modules assembled in a brickstone connection, the second modules forming so-called end modules, present exclusively at the outer edge of the mat, viz. alternately with a module of the first type, viewed in the conveying direction of the mat. This patent application also describes the possibility of manufacturing a narrow conveyor mat, consisting exclusively of second or end modules, said modules being alternately arranged, such that at each lateral edge of the mat a wide end hinge plate and a relatively narrow plate portion are alternately present.

In so-called "shrink-wrap" machines, narrow conveyor mats are used, because in such machines it is desired that bottles, cans and the like to be packed can be conveyed in a single line. Up to the present, such conveyor mats have been manufactured by shortening a wide mat in transverse direction by a sawing operation. This entails the drawback of creating additional labor costs and of the mat having an irregular lateral edge. A further problem is that the known mats are guided in a slot-shaped section. Consequently, it is not possible to form, if so desired, a wider conveying surface consisting of several tracks in close side-by-side relationship, because the lateral edges of adjacent mats cannot lie in close side-by-side relationship.

The object of the invention is to provide a conveyor mat for such practical applications which does not have the above drawbacks. To that end, according to a first aspect, the invention provides a conveyor mat of the above-mentioned type, characterized in that of at least a number of modules in the conveyor mat, the end hinge plate and/or the plate-shaped part T extends to a position below the surface of the mat formed by the successive modules, the arrangement being such that the thus formed downward extension forms a lateral guide for the conveyor mat.

In accordance with a second aspect, the invention provides a conveyor mat of the above type, characterized in that for each module of the conveyor mat, the end hinge plate and the plate-shaped part T are provided with a recess extending throughout the length of the module and adjoining the bottom face of the mat formed by the successive modules, the arrangement being such that the recesses can cooperate with a guide of U-shaped cross section.

Surprisingly, it has been found that by the features according to the invention, a conveyor mat for use with shrink-wrap machines is readily obtained, which conveyor mat can be manufactured in an inexpensive manner, which has a substantially completely smooth and flat lateral edge and can be guided over a tubular member or a U-shaped section located between the downwardly directed guide faces formed on either side of the mat or engaging the recesses present on either side of the mat respectively, enabling adjacent mats to be built with their lateral edges closely against one another, if so desired.

Further advantages are that the mat can easily be lifted from the section due to the lack of so-called tabs or bevels for guidance. Also, the mat according to the invention can be extremely narrow, for instance 30 mm, which may be desired for specific practical applications, such as the transport of cans of beverage.

Preferably, also in the mat according to the first aspect of the invention, both the end hinge plate and the plate-shaped part of each module in the mat are designed with a downward extension. Further, adjacent each hinge plate there is preferably provided a plate-shaped part.

Figure 2:
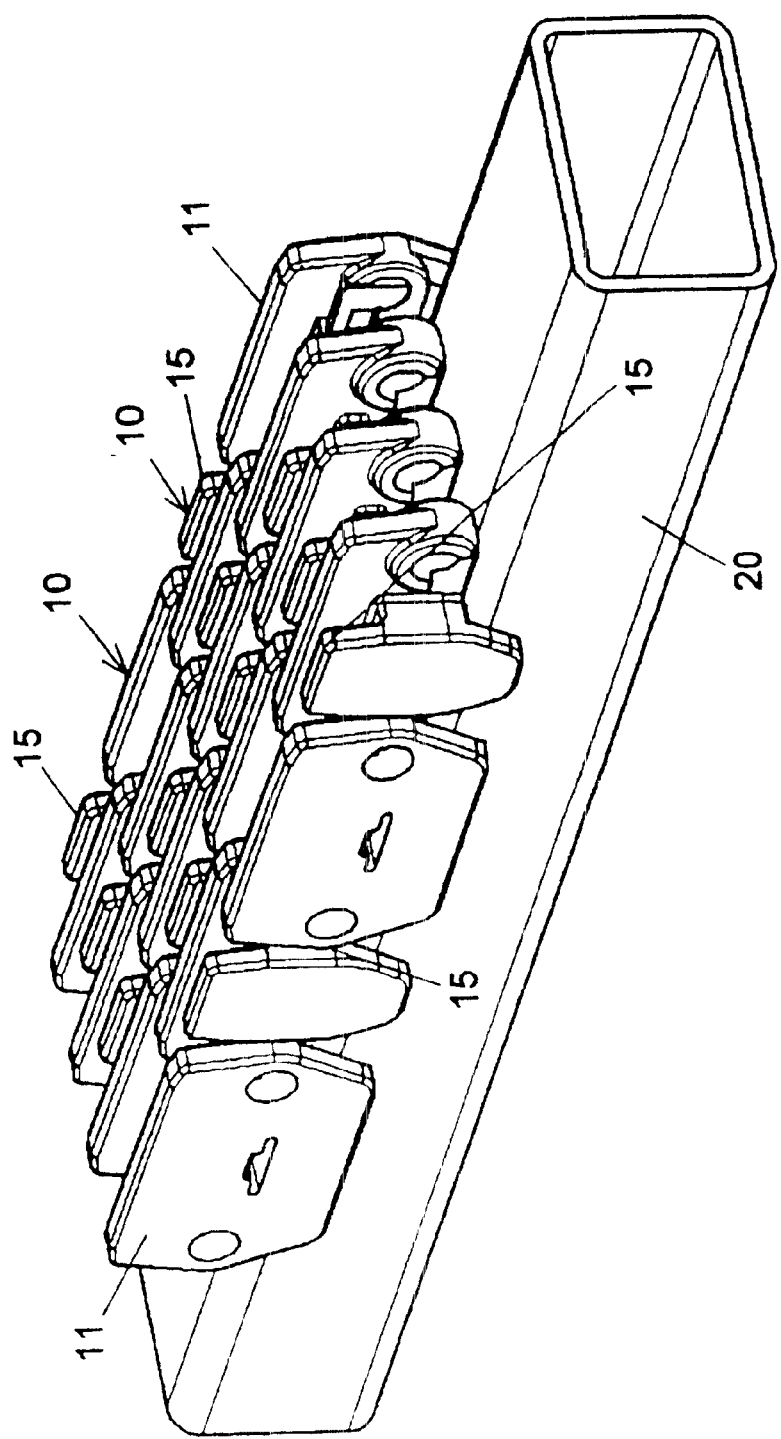
Figure 3:
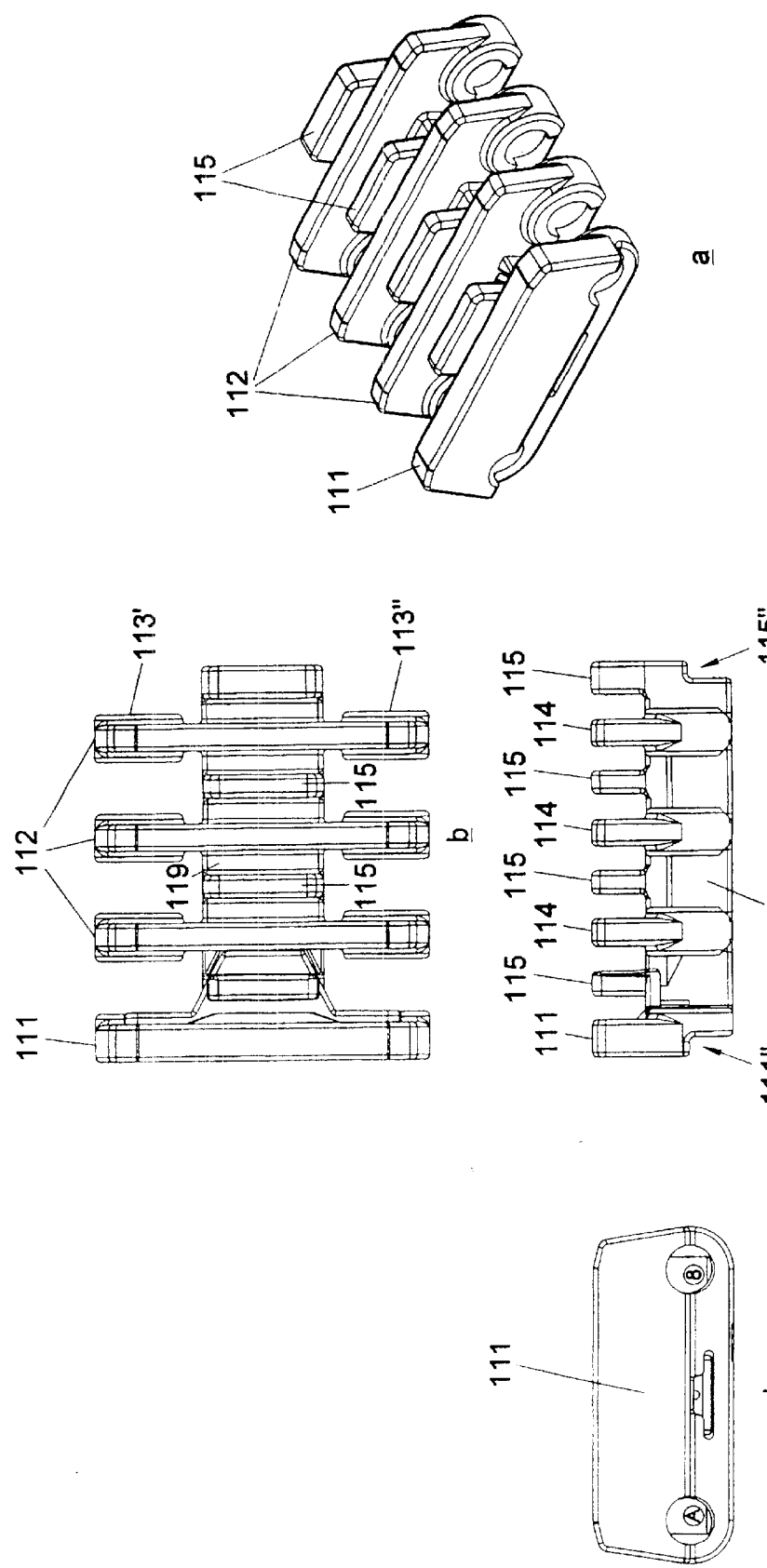
Figure 4:
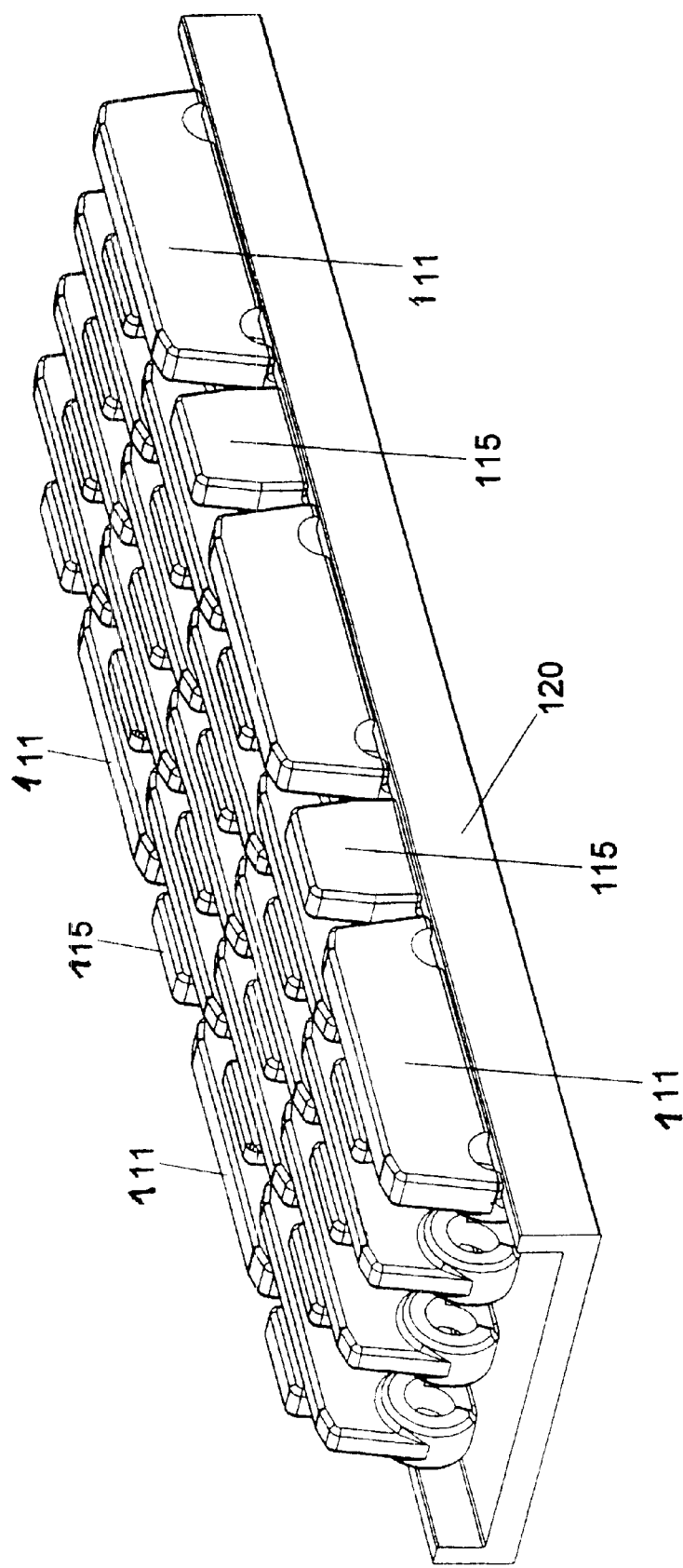

Hereinafter, the invention will be specified on the basis of two exemplary embodiments, with reference to the accompanying drawings. In these drawings:

Figs. 1a–d are a bottom view, a side elevation and two end views respectively of a module intended for the conveyor mat according to the first embodiment of the invention;

FIG. 2 is a perspective view of a portion of a conveyor mat assembled from modules according to FIG. 1, on a guide rail;

FIGS. 3a–d are a perspective view, a top plan view, a side elevation and an end view respectively of a module intended for a conveyor mat according to a second embodiment of the invention; and FIG. 4 is a perspective view of a portion of a conveyor mat assembled from modules according to FIG. 3, on a guide section.

FIG. 1 shows an exemplary embodiment of a module for a conveyor mat according to the invention, which mat is of the so-called "raised rib" type. However, it is emphasized that the advantages of the conveyor mat according to the invention also continue to exist when the mat is of the so-called "flush grid" or "flat top" type, where the hinge plates of the modules of the mat are not provided with raised, plate-shaped parts for supporting products to be conveyed or are provided with an entirely closed top face.

A module 10 forms one whole and is, for instance, manufactured by injection molding. A module comprises an end hinge plate 11 and a number of substantially identical hinge plates 12, equally spaced apart, each hinge plate being provided, on both ends and on both sides of the body of the hinge plate, with thickened hinge loops 13', 13", in which an opening 16 for a hinge pin is formed. The end hinge plate 11 does not have this thickening of the hinge loops on the outside of the module. The hinge loops and openings are configured such that all openings of the modules register, also when the hinge plates of two modules adjoining in longitudinal direction of the mat interlock in that the hinge plates of one module are in each case located between the hinge plates of the other module. In this manner, the width of a module is determined by the number of hinge plates of which it consists and the length of a module is determined by the length of a hinge plate.

The hinge plates 12 are provided with plate-shaped parts 14 extending upwards in the plane of the respective hinge plates and constituting a bearing face for products to be conveyed.

Provided next to the hinge plates 12 of a module, always equally spaced therefrom, are plate-shaped parts 15, serving to create in a mat assembled from a series of modules a conveying face that is closed as regularly as possible and has a lightest possible construction, which is of importance for a low driving power required and for a low cost price. However, it is possible to provide a plate-shaped part 15 at the end of the module only, for instance in a flat-top mat.

The hinge plates 12 and the plate-shaped parts 15 are interconnected and are equally spaced apart by a transverse rib 18.

On the bottom side of the modules, additional ribs 19 may be provided, as shown in Fig. 1b, to support the plateshaped parts 15 and reinforce the modules, these ribs lying between the ends of a module in one plane with the bearing face of the module.

As shown in FIG. 2, the conveyor mat according to the invention is built up from a single row of modules, of which modules the end hinge plates 11 are alternately located on one and the other lateral side of the mat.

According to the invention, in a module, at least the end hinge plate 11 or a plate-shaped part 15, preferably the plate-shaped part at the end of the module, and preferably both, is/are provided with a plate portion 11' or 15' respectively, extending to a position below the bottom face formed by the successive modules. These plate portions serve for guiding the mat over a rail 20, for instance a rectangular tube. For different mat widths, this tube may, for instance, have a width of 30, 40 or 50 mm, the total mat width being 38, 48 or 58 mm respectively. Such narrow mats have hitherto been impossible to realize.

As is clearly demonstrated in FIG. 2, the lateral side of the conveyor mat formed by the successive modules is entirely flat without laterally projecting parts. This does not only offer the possibility of forming one large conveying face with several mats juxtaposed in the width direction and driven at the same speed, without any irregularity in the pattern of the raised ribs which jointly constitute the bearing surface for products, but also of driving the juxtaposed mats at different speeds without causing the risk of the lateral sides catching behind each other or obstructing each other's progress.

FIGS. 3 and 4 show an exemplary embodiment of the conveyor mat according to the second aspect of the invention. In these Figures, identical parts are designated by the same reference numerals as in FIGS. 1 and 2, but preceded by the number "1".

The difference from the embodiment according to FIGS. 1 and 2 is that the end hinge plate 111 and the outer plate-shaped part 115 are provided with a recess 111" and 115" extending throughout the length of the module, from the bottom side of the module to about halfway the height of the hinge loops 116. As FIG. 4 shows, the mat assembled from such modules can simply be guided through a U-shaped guide section 120. In this variant, too, several mats can be mounted in close side-by-side relationship, while for the guidance, for instance a single plate having raised parallel ribs can be used, each rib, except the outermost two ribs, having such width that it can act as rail for two adjoining mats.

What is claimed is:

1. A conveyor mat built up from modules (10) manufactured in one whole from plastic, each module consisting of a number of substantially equally spaced apart hinge plates (12) and an end hinge plate (11), each extending over substantially the entire length of the module and each having both ends provided with hinge loops (13', 13"), the hinge plates (12) of a module being intercoupled by at least one transverse rib (18) and there being provided, adjacent at least the outer hinge plate at the transverse end of the module located opposite the end hinge plate, a plate-shaped part (15) extending parallel to said hinge plate over a distance smaller than the distance between the hinge loops (13', 13") in a hinge plate (11, 12) and coupled to the at least one rib of the module and whose top side lies substantially in one plane with the top side of the mat, the end hinge plates of the successive modules being alternately located on one and on the other lateral side of the conveyor mat, the ends of the hinge plates on a longitudinal side of a module being located between the ends of the hinge plates of a module adjoining in longitudinal direction of the mat, the hinge loops of the two modules being substantially in alignment and intercoupled by a hinge pin extending through the hinge loops, characterized in that of at least a number of modules, the end hinge plate (11) and/or the plate-shaped part (15) that is located opposite the end hinge plate extends to a position below the bottom face of the mat formed by the successive modules, the arrangement being such that the thus formed downward extension forms a lateral guide for the conveyor mat.

2. A conveyor mat built up from modules (110) manufactured in one whole from plastic, each module consisting of a number of substantially equally spaced apart hinge plates (112) and an end hinge plate (111), each extending over substantially the entire length of the module and each having both ends provided with hinge loops (113', 113"), the hinge plates (112) of a module being intercoupled by at least one transverse rib (118) and there being provided, adjacent at least the outer hinge plate at the transverse end of the module located opposite the end hinge plate, a plate-shaped part (115) extending parallel to said hinge plate over a distance smaller than the distance between the hinge loops (113', 113") in a hinge plate (111, 112) and coupled to the at least one rib of the module and whose top side lies substantially in one plane with the top side of the mat, the end hinge plates of the successive modules being alternately located on one and on the other lateral side of the conveyor mat, the ends of the hinge plates on a longitudinal side of a module being located between the ends of the hinge plates of a module adjoining in longitudinal direction of the mat, the hinge loops of the two modules being substantially in alignment and intercoupled by a hinge pin extending through the hinge loops, characterized in that in each module in the conveyor mat, the end hinge plate (111) and the plate-shaped part (115) that is located opposite the end hinge plate are provided with a recess (111", 115") extending throughout the length of the module and adjoining the bottom face of the mat formed by the successive modules, the arrangement being such that the recesses (111", 115") can cooperate with a guide having a U-shaped cross section.

3. A conveyor mat according to claim 1, characterized in that next to each hinge plate (11, 12; 111, 112) there is provided a plate-shaped part (15; 115).

4. A conveyor mat according to claim 1, characterized in that each hinge plate comprises a further plate-shaped part (14; 114) extending upwards in the plane of said hinge plate over substantially the entire length thereof, the top sides of the further plate-shaped parts forming a conveying face and the top sides of the plate-shaped parts (15; 115) being substantially located in one plane with the top sides of the further plate-shaped parts (14; 114).

5. A conveyor mat according to claim 1, characterized in that the top side of each module forms a closed surface.

6. A conveyor mat according to claim 1, characterized in that both the end hinge plate and the plate-shaped part extend to a position below said bottom face.

7. A module for a conveyor mat built up from modules (10) manufactured in one whole from plastic, each module consisting of a number of substantially equally spaced apart hinge plates (12) and an end hinge plate (11), each extending over substantially the entire length of the module and each having both ends provided with hinge loops (13', 13"), the hinge plates (12) of a module being intercoupled by at least one transverse rib (18) and there being provided, adjacent at least the outer hinge plate at the transverse end of the module located opposite the end hinge plate, a plate-shaped part (15) extending parallel to said hinge plate over a distance smaller than the distance between the hinge loops (13', 13") in a hinge plate (11, 12) and coupled to the at least one rib of the module and whose top side lies substantially in one plane with the top side of the mat, the end hinge plates of the successive modules being alternately located on one and on the other lateral side of the conveyor mat, the ends of the hinge plates on a longitudinal side of a module being located between the ends of the hinge plates of a module adjoining in longitudinal direction of the mat, the hinge loops of the two modules being substantially in alignment and intercoupled by a hinge pin extending through the hinge loops, characterized in that of the module, the end hinge plate (11) and/or the plate-shaped part (15) that is located opposite the end hinge plate extends to a position below the bottom face of the module formed by the successive hinge plates (12).

8. A module for a conveyor mat built up from modules (110) manufactured in one whole from plastic, each module consisting of a number of substantially equally spaced apart hinge plates (112) and an end hinge plate (111), each extending over substantially the entire length of the module and each having both ends provided with hinge loops (113', 113"), the hinge plates (112) of a module being intercoupled by at least one transverse rib (118) and there being provided, adjacent at least the outer hinge plate at the transverse end of the module located opposite the end hinge plate, a plate-shaped part (115) extending parallel to said hinge plate over a distance smaller than the distance between the hinge loops (113', 113") in a hinge plate (111, 112) and coupled to the at least one rib of the module and whose top side lies substantially in one plane with the top side of the mat, the end hinge plates of the successive modules being alternately located on one and on the other lateral side of the conveyor mat, the ends of the hinge plates on a longitudinal side of a module being located between the ends of the hinge plates of a module adjoining in longitudinal direction of the mat, the hinge loops of the two modules being substantially in alignment and intercoupled by a hinge pin extending through the hinge loops, characterized in that of the module, the end hinge plate (111) and the plate-shaped part (115) that is located opposite the end hinge plate are provided with a recess (111", 115") extending throughout the length of the module and adjoining the bottom face of the module.

* * * * *